(12) United States Patent
Marais et al.

(10) Patent No.: US 7,739,391 B2
(45) Date of Patent: Jun. 15, 2010

(54) GATEWAY FOR WIRELESS MOBILE CLIENTS

(75) Inventors: Charl Marais, Rueschlikon (CH); Silvano Maffeis, Baden (CH)

(73) Assignee: Softwired AG, Bonstetten (CH)

( * ) Notice: Subject to any disclaimer, the term of this patent is extended or adjusted under 35 U.S.C. 154(b) by 718 days.

(21) Appl. No.: 11/276,178

(22) Filed: Feb. 16, 2006

(65) Prior Publication Data

US 2007/0192495 A1    Aug. 16, 2007

(51) Int. Cl.
*G06F 15/16* (2006.01)
(52) U.S. Cl. ..................................... 709/227
(58) Field of Classification Search ................. 709/227
See application file for complete search history.

(56) References Cited

U.S. PATENT DOCUMENTS

| | | | | |
|---|---|---|---|---|
| 6,272,129 | B1 * | 8/2001 | Dynarski et al. | 370/356 |
| 6,308,281 | B1 * | 10/2001 | Hall et al. | 714/4 |
| 6,628,671 | B1 * | 9/2003 | Dynarski et al. | 370/469 |
| 6,721,779 | B1 | 4/2004 | Maffeis | |
| 6,877,023 | B1 | 4/2005 | Maffeis et al. | |
| 6,912,581 | B2 * | 6/2005 | Johnson et al. | 709/228 |
| 6,970,443 | B2 * | 11/2005 | Dynarski et al. | 370/338 |
| 7,117,266 | B2 * | 10/2006 | Fishman et al. | 709/228 |
| 7,127,496 | B2 * | 10/2006 | Isozu et al. | 709/217 |
| 2002/0069241 | A1 | 6/2002 | Narlikar et al. | |
| 2002/0078209 | A1 | 6/2002 | Peng | |
| 2002/0081971 | A1 * | 6/2002 | Travostino | 455/41 |
| 2002/0120717 | A1 | 8/2002 | Giotta | |
| 2003/0009511 | A1 | 1/2003 | Giotta et al. | |
| 2003/0018887 | A1 | 1/2003 | Fishman et al. | |
| 2003/0028804 | A1 * | 2/2003 | Noehring et al. | 713/201 |
| 2003/0236905 | A1 * | 12/2003 | Choi et al. | 709/231 |
| 2005/0091380 | A1 * | 4/2005 | Gonen et al. | 709/227 |
| 2005/0177865 | A1 * | 8/2005 | Ng et al. | 726/3 |
| 2005/0193124 | A1 * | 9/2005 | Chou et al. | 709/228 |

(Continued)

FOREIGN PATENT DOCUMENTS

WO    0205507    1/2002

(Continued)

OTHER PUBLICATIONS

IBM, IBM Lotus Mobile Connect—Product Documentation, Jan. 1, 2006.*

(Continued)

*Primary Examiner*—Patrice Winder
*Assistant Examiner*—Thomas Duong
(74) *Attorney, Agent, or Firm*—Oppedahl Patent Law Firm LLC

(57) ABSTRACT

A method for operating a gateway for wireless mobile clients in a messaging system, the messaging system being configured to comprise a plurality of mobile wireless clients (1, 1', 1"), a core messaging system (7) and at least one gateway process or gateway (5, 5', 5") acting as a proxy on behalf of the clients (1, 1', 1"), the method comprising the step of the gateway (5, 5', 5") storing a session context (11), which session context (11) comprises the status of a session established between the core messaging system (7) and one of the clients (1, 1', 1"), a state of the client connection associated with the session, and a session identifier which is unique to the session.

8 Claims, 2 Drawing Sheets

U.S. PATENT DOCUMENTS

| | | | |
|---|---|---|---|
| 2005/0198320 A1* | 9/2005 | Chou et al. | 709/228 |
| 2006/0168275 A1* | 7/2006 | Lin et al. | 709/230 |
| 2006/0218287 A1* | 9/2006 | Dodrill et al. | 709/227 |
| 2007/0091875 A1* | 4/2007 | Rahman | 370/352 |
| 2007/0174410 A1* | 7/2007 | Croft et al. | 709/208 |

FOREIGN PATENT DOCUMENTS

| | | |
|---|---|---|
| WO | 0235790 | 5/2002 |
| WO | WO 2004/008332 | 1/2004 |
| WO | WO 2004079492 A2 * | 9/2004 |

OTHER PUBLICATIONS

Amjad Umar, Mobile Computing and Wireless Communications, Jul. 28, 2004.* iBus/Mobile 1.0 product webpage, dated Feb. 2, 2001.

Whitepaper, "Middleware Support for Application-to-Application Wireless Messaging", by Silvano Maffeis, presented at the WROX Professional Wireless Developers Conference, Amsterdam, Jul. 2000.

Press Release, "Softwired's Award Winning Wireless Product is GPRS Ready", dated Nov. 28, 2000.

Press Release, "Softwired Wireless Product Awarded Prestigious Prizes by Symbian", dated Nov. 20, 2000.

* cited by examiner

GATEWAY FOR WIRELESS MOBILE CLIENTS

FIELD OF THE INVENTION

The invention relates to the field of messaging systems for wireless mobile devices and in particular to a method for operating a gateway for wireless mobile clients, a corresponding computer program and a gateway for providing a gateway functionality by which wireline messaging systems can be extended to reach wireless mobile clients.

BACKGROUND OF THE INVENTION

When working with a mobile application, that is, a program application running on a mobile device, it is desirable that the user may continue working with the application even when disconnected from the network. In such a situation, the end-to-end connection between device and central (wireline) system infrastructure is not available, due to a disruption on the unreliable wireless network component of the connection. In consequence, those applications are best built using a MOM (message oriented middleware) technology that combines client layers and a dedicated wireless gateway proxy that cooperate to shield mobile applications from wireless connection loss. Such MOM components use store and forward, session maintenance and sliding window to ensure message delivery and client session integrity.

Messaging is a model in which applications are loosely coupled through the exchange of self-describing messages. This may be likened to "e-mail for applications". Messaging allows producer applications to send messages to consumer applications, in a reliable and scalable manner. The messaging system decouples producers and consumers. It is in charge of transporting and storing messages. "Producer" and "Consumer" are just roles an application can play. An application can be both producer and consumer simultaneously, or switch roles dynamically at run-time. Two typical communication models implemented by a message system such as the commonly known JMS (Java Messaging System) are "Publish/Subscribe", and "Point to Point messaging".

An approach taken by Softwired Inc., with its MOM technology, iBus//Mobile and iBus//MessageServer products is to use Java and/or C# technology to extend connectivity straight through from the mobile devices to the centralized application servers. Customized applications are deployed on the mobile device, and on the server computers, using standards-based Java messaging middleware technology. A wireless data network such as GPRS, EDGE, UMTS, Mobitex, and future Wireless Broadband '4G' is used to connect the mobile devices to the servers in a flexible and scalable manner.

The iBus//Mobile product defines a protocol between a mobile client layer, and a wireless proxy gateway. The mobile layer makes a JMS based API available to mobile applications, and propagates client application operations on that API across wireless networks (e.g. GSM, GPRS, UMTS) to the proxy using the protocol. Based on protocol messages received in packets across the wireless network, the gateway process is able to reflect/reproduce the mobile client operations (to the mobile API) on a proxy JMS connection between the gateway and the central messaging infrastructure. The gateway maintains this central JMS connection on behalf of the mobile client.

Such a Wireless JMS (WJMS) deployment consists of Java-enabled and non Java mobile devices (PDAs, Communicators, JavaPhones, .Net Compact Framework and Linux devices etc.) with a WJMS client library installed. The devices use a wireless network to communicate with a WJMS gateway service. The gateway is a software component able of receiving WJMS messages from a wireless network, and of relaying these messages to a server-side JMS provider. The JMS provider either is a stand-alone JMS messaging server such as Softwired's iBus//MessageServer product, or a compliant J2EE application server such as BEA's WebLogic Server or SAP Web Application Server or JBoss Application Server product, which should contain a JMS layer. Such a Wireless JMS (WJMS) deployment consists of programmable mobile devices (PDAs, Communicators, JavaPhones, etc.) with the WJMS client layer installed. The devices use a wireless network to communicate with a WJMS gateway service. Provided the WJMS client layer that is compatible with the mobile platform such as JavaME, Java configurations CLDC, CDC (targeting profiles such as MIDP and IMP, .Net Compact Framework (C#)) is available, client applications can be deployed to various environments (e.g. RIM Blackberry, Palm, Symbian, Windows CE, Linux etc).

Softwired's U.S. patents U.S. Pat. No. 6,877,023 "Messaging system for delivering data in the form of portable message formats between message clients" and U.S. Pat. No. 6,721,779 "Messaging proxy system" disclose mechanisms for transporting the higher level WJMS messages over the wireless link while hiding the underlying communication layer. U.S. patent applications U.S. 20020120717 and 20030009511, disclose a message system for delivering data in the form of messages between message clients, the system comprising a server cluster with a group of client manager nodes and a group of independent message manager nodes. The client manager nodes have the function of managing client connections, whereas the message managers are configured to store and distribute messages.

Since wireless connections are inherently unreliable, the connections between clients and gateways will be interrupted from time to time. In consequence, the client, e.g. through an automated procedure implemented in the underlying communication level, will try to reestablish connection. It is now desirable to "reconnect the loose ends" left by the severed communication. Current technology offers no satisfying solution to this problem.

DESCRIPTION OF THE INVENTION

It is therefore an object of the invention to create a method for operating a gateway for wireless mobile clients, a gateway computer for wireless mobile clients and a computer program for operating a gateway for wireless mobile clients of the type mentioned initially, which overcomes the disadvantages mentioned above.

It is a further object of the invention to provide a method for operating a gateway that allows for an efficient and failure-free reconnection of clients after losing the connection to a gateway.

It is a further object of the invention to provide a method for operating a gateway that allows connection through multiple gateways while maintaining a consistent representation of connections and sessions.

The method for operating a gateway for wireless mobile clients in a messaging system, has the messaging system being configured to comprise a plurality of mobile wireless clients, a core messaging system and at least one gateway process or gateway acting as a proxy on behalf of the clients. In the course of normal operation of the messaging system, the gateway maintains sessions by performing the steps of, the gateway receiving inbound application data messages from the clients over connections using a wireless protocol and forwarding said inbound data messages to the core messaging system over a connection using a wirebound protocol;

the gateway receiving outbound data messages from the core messaging system over a connection using a wirebound protocol and forwarding said outbound data messages to the clients over connections using a wireless protocol;

The method further comprises the step of the gateway storing a session context, which session context comprises the status of a session established between the core messaging system and one of the clients, a state of the client connection associated with the session, and a session identifier which is unique to the session.

The unique session ID does not change through client reconnect (due to wireless network outages), hence on reconnection the gateway is able to identify and reestablish the connection and its state on behalf of the reconnecting client. This relieves the client or client application of having to reestablish the connection state on reconnection. This also relieves the client of having to track and record the history of operations, which led to the current connection state. The use of session ID's elegantly solves the problem of having IP addresses dynamically assigned by the mobile network: such IP addresses are not reliable for identifying a client or a connection since they may change.

The step of forwarding inbound application data messages preferably comprises the gateway receiving inbound WJMS messages indicating the initiation by the mobile client application of an WJMS API operation that should be propagated to the core messaging system by the gateway. Such operations and messages may alter the state of both connections, i.e. both between the gateway and the core messaging system and between the mobile application and the gateway process.

The step of forwarding outbound application data messages preferably comprises the gateway receiving outbound JMS notifications from the core messaging system that operations performed by the gateway on its connection to the core messaging system have either failed or succeeded. Such notifications must be propagated to the mobile client by the gateway and may change the state of both connections.

Since wireless networks are unreliable, the e.g. TCP connection between client device and gateway can go down intermittently. The state of the connection is not immediately propagated consistently between the two TCP end points. This results in a state where the gateway process is unable to distinguish its (soon to be terminated) end point from a valid TCP connection, and where the client has already lost the connection and is trying to reconnect. Network latency can allow such a state to persist for some time. While this inconsistent state persists the gateway process may receive multiple connect (or reconnect) requests from the same device.

Since wireless networks are unreliable, the stream of packets between client device and gateway can be delivered inconsistently (some packets may never arrive, some packets may arrive out of order). Furthermore, the application level data stream end points in client and gateway processes can independently of each other become invalid. At such times the respective client, on discovering its disconnection from the gateway must re-instantiate the bearer layer, which implies a new data stream. As already mentioned, a state where the gateway is unable to distinguish its no longer valid end point from a valid one, and where the client has already lost the stream and is trying to reestablish an application level connection can persist for some time. While this inconsistent state persists, the gateway process may receive multiple stream establishment (or reestablishment) requests from the same device.

Using the connection and session state stored by the gateway on behalf of the client, the method further ensures that the instantiation of this state, and the association of the state with a particular WJMS connect request, results in the current stream establishment request being ultimately associated with the correct session state. This is done by ensuring that the processing of client accept or connect requests is mutually exclusive with respect to the session identifier.

As a result, the client device does not have to restore the session state on reconnection, which would require the client to track the history of WJMS and/or JMS operations initiated by its own session.

As a further result, the gateway can maintain a consistent view of the client session in the face of many concurrent connect requests from the client. Without this the session state, as maintained by the gateway, cannot be consistently updated, and legitimate reconnect requests by the client would be rejected by the gateway as duplicates.

A two phase connect method between mobile clients and the gateway service further allows reconfiguration of individual gateways, as well as load balancing between multiple gateways, which means the system can both scale, be highly available and support failover functionality.

The computer program for operating a gateway for wireless mobile clients in a messaging system is loadable and executable on a data processing unit in a gateway computer, the messaging system being configured to comprise a plurality of mobile wireless clients, a core messaging system and the gateway computer for providing message forwarding from the clients to the core messaging server and vice versa. The computer program, when being executed on the gateway computer, performs the steps of the method according to the invention. In a preferred embodiment of the invention, the computer program product comprises a computer readable medium, having the computer program code means recorded thereon.

Further preferred embodiments are evident from the dependent patent claims. Features of the method claims may be combined with features of the device claims and vice versa.

BRIEF DESCRIPTION OF THE DRAWINGS

The subject matter of the invention will be explained in more detail in the following text with reference to preferred exemplary embodiments, which are illustrated in the attached drawings, which schematically show.

The reference symbols used in the drawings, and their meanings, are listed in summary form in the list of reference symbols. In principle, identical parts are provided with the same reference symbols in the figures.

DETAILED DESCRIPTION OF PREFERRED EMBODIMENTS

Figure 1:
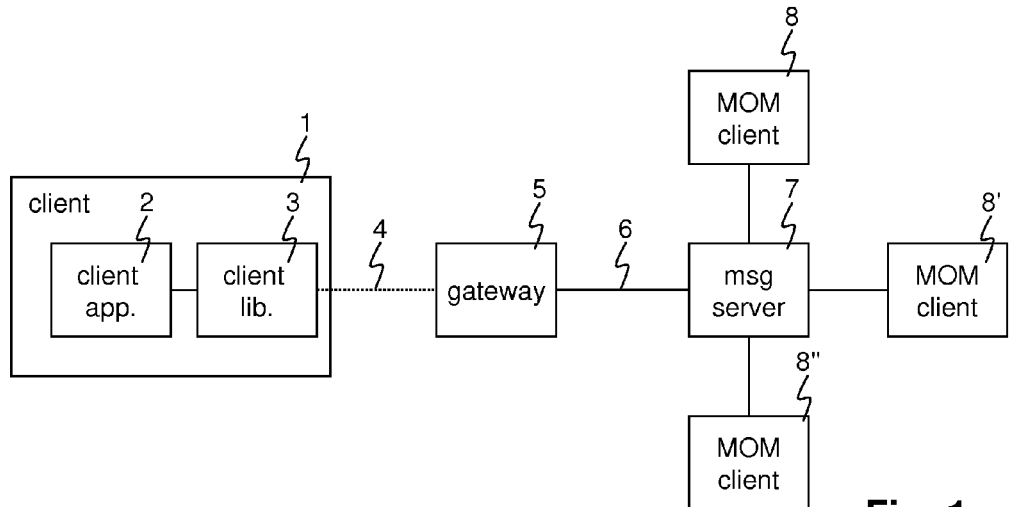
FIG. 1 a basic system structure.

FIG. 1 shows a basic system structure: Mobile clients 1, 1', 1" such as computers, cell phones, personal digital assistants, automatic field devices for measurement and control etc. each comprise a client application 2 and a client library 3. The client application 2 is a computer application that does the actual work the user or owner of the client 1, 1', 1" is interested in. The client library 3 provides software functions with an API that allows the client application 2 to communicate over a wireless network by means of a higher level protocol such as Softwired's WJMS (Wireless Java Messaging Service) or similar. The client library 3 may establish a wireless connection 4 to a gateway 5 according to said protocol, based on a lower level protocol, in particular a bearer layer of the wireless network. The gateway 5, as well as a number of other messaging clients 8, 8', 8", are connected to a core messaging server 7 by a higher level protocol with e.g. JMS connections 6, 6', 6" running over a wirebound network.

The gateway 5 acts as a proxy on behalf of the client 1, maintaining a JMS connection to the messaging server 7 during normal operation and also in the case when the wireless connection 4 is interrupted and there is no WJMS connection with the client 1.

Whereas henceforth reference shall be made mainly to a Java-based messaging system, it is understood that the concepts presented are applicable to other non Java-based message queuing technologies, as applied e.g. in IBM MQ Series and Microsoft Message Queuing—MSMQ.

Figure 2:
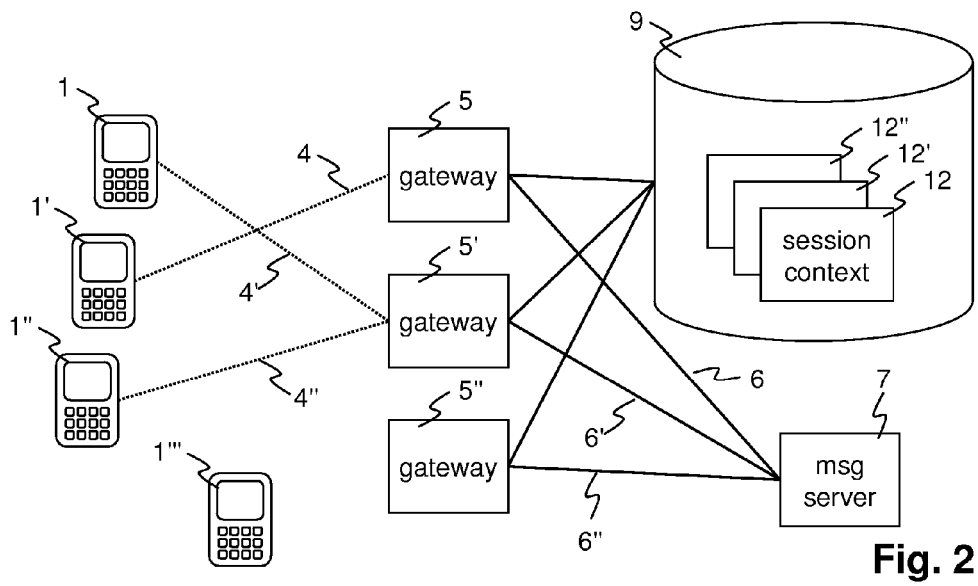
FIG. 2 a system structure with a gateway cluster.

FIG. 2 shows a system structure with a gateway cluster with a plurality of gateways 5, 5', 5" instead of a single gateway 5. Each of the clients 1, 1', 1" may connect to any one of the gateways 5, 5', 5", provided that the respective gateway 5, 5', 5" is in operational condition. Each of the gateways 5, 5', 5" may connect to a persistent data store 9 that is common to the gateways 5, 5', 5", allowing them to maintain and to share a consistent representation of the status of connections, relocating clients, and restart of a gateway 5 when necessary, using the information in the data store 9. The data store 9 implemented by a file system or a database system at one of the gateways 5, 5', 5", at the messaging server 7 or at a further, separate location, is accessible to all the cluster member gateways 5, 5', 5" over further wirebound connections over the wired infrastructure. The data store 9 stores, for the connections and sessions established by clients to the gateways 5, 5', 5", a session entry in the session store or session locking context 12 and provides a locking mechanism for controlling access to the said session entry or locking context 12. The session entry contains a representation of (JMS) connection state resulting from mobile client application use of the client library 3 (WJMS API), and reflected by the gateway 5 on the corresponding (JMS) client connection.

The gateways 5, 5', 5" are further configured to inform one another about their operational status, or to query one another about the status directly, or to store and retrieve such status information in the data store 9.

Figure 3:
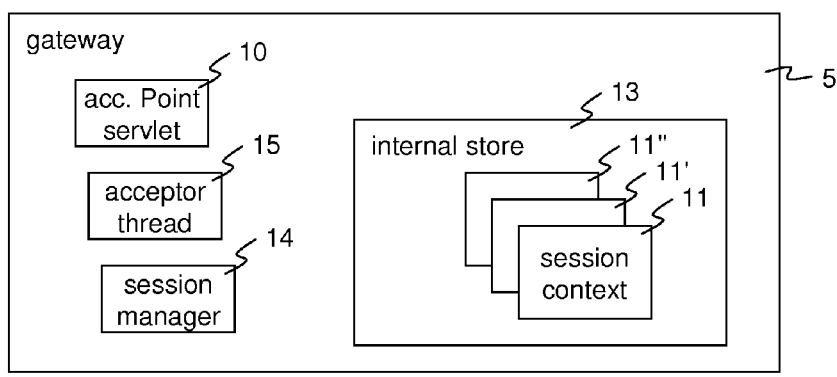
FIG. 3 an internal structure of a gateway.

FIG. 3 shows an internal structure of a gateway 5. The gateway 5, depending on the context, is either a gateway computer, or only a gateway process, which may in turn comprise a plurality of process threads and sub-processes, running on a gateway computer. The different gateways 5, 5', 5" typically run on physically or geographically separated gateway computers. A gateway 5 comprises a servlet 10 for responding to phase one connection requests, acceptor threads 15 that execute a response logic for responding to phase two connection requests, and one client session manager 14 for managing mobile client sessions of the gateway service.

The client session manager 14 checks and updates session information stored for each of the sessions in a separate session store or session context 11. For example, the client session manager 14 may create, lock, look-up, unlock or delete sessions. The created sessions create producers, publish messages, remove producers, close connections etc. as defined by the JMS API. When modifying a session in this manner, the client session manager 14 updates a session context 11. During the update, access to the session context 11 is locked, as shall be explained later on. The session context 11 is stored in a local memory section 13 of the gateway 5. In a preferred embodiment of the invention, the session context 11 is mirrored a the data store 9 and represented there as a mirrored session entry 12 as well.

Further terms and concepts used are summarized in the following Glossary:

Wireless Network(s): This includes any wireless network, which carries data such as GSM, GPRS, EDGE, UMTS, Mobitex, and new generation networks such as '4G' wireless broadband.

Client: An application or object that produces and consumes messages, where messages are objects that contain the data being transferred between clients.

Sliding window: A set of unacknowledged messages between two peers. For each message in the window the peers agree, by exchanging acknowledgments, which messages have been received, and which are still pending an acknowledgment. Messages that are known to have been received by the peer are deleted from the window. At any time a peer may ask for a rebroadcast of any message in the window. Messages in the sliding window are numbered, and the peers agree as to the next sequence numbers to be sent and acknowledged. The sliding window preferably is implemented as a list of references or pointers to messages.

Access point: An HTTP URL at which a clustered gateway locator Servlet can be reached during phase 1 of connecting to a gateway cluster.

Connect point: A location at which a clustered gateway can be contacted, and a WJMS connection can be established during phase 2 of connecting. It specifies: IPAddress (numeric or alphanumeric), port number, and bearer protocol that is supported.

A WJMS Connection exists between an application running on a programmable wireless device and a running instance of the gateway. End points in the gateway and the client library accept WJMS messages for transmission to the (single) corresponding end point in the client library 3 or gateway 5. Such transmissions occur across the bearer layer.

An iBus//Mobile session defines a context within which messages (sent across a WJMS connection) are sent. The context includes:

The session identifier.
The WJMS connection.
The state of the JMS connection.
A sliding window of WJMS messages between client and gateway.

The session ID is set by the client application 2. The client application 2 ensures that the session ID is unique. An iBus//Mobile session persists through connection loss and reestablishment, caused by the unreliable nature of wireless networks.

Given the state of the session and the set of unacknowledged messages represented by the sliding window, the client library can reestablish connection with the gateway after a loss of connection or after a changeover from another gateway.

The following sections give an overview of the operation of the mobile gateway clustering system and method, henceforth called "iBus Mobile gateway". Clustering functionality enables separate iBus Mobile gateway processes to cooperatively provide the gateway service between JMS wire-line networks and wireless networked devices. The clustered release scales up the existing single gateway version of iBus Mobile such that multiple gateways cooperate to service mobile client messaging needs.

What Functionality Implements Gateway Clustering?
1. All clustered gateways are aware of all other gateways in the same cluster. Each gateway reads the cluster membership from its configuration file.
2. An HTTP Servlet (the cluster connect servlet) running in each Gateway can answer client requests for the IPAddresses of cluster members.
3. Mobile clients connect to the cluster in a two phase way. First, requesting the list of IPAddresses where cluster members can be found, and then sequentially trying each member in the list for the proper WJMS connection.
4. This documentation distinguishes between access point URLs and connect point URLs. Access points are the locations at which cluster connect servlets for the cluster can be contacted. Connect points are returned in the lists of connect URLs that clients receive from cluster connect servlets.
5. All gateways share the same session store so any gateway can respond to any client request for a WJMS connection. Note that the session DB store must be located on an NFS or similar file system location or a shared database. All gateways will read and write to that location.
6. Connection establishment always follows the two phases. First get the cluster membership list and then try each member in turn. Regardless of four connection scenarios;
   a) Initial client connection.
   b) Normal client reconnect (after orderly client shutdown).
   c) Session re-establishment after connection loss.
   d) Fail-over scenario where one (or more) gateway(s) fail.
7. The clients will try members in the order of the connect points list received during phase one. So the algorithm of where to direct client load is centrally controlled (within the cluster).
8. Gateway Clustering supports load balancing. Various load-balancing strategies are configurable such as load balance according to client connections, cpu load on the gateway processor, memory available to the gateway process, etc.
9. Sharing the session store location among all cluster members reduces client session re-establishment to an operation similar to re-establishment in the stand-alone gateway case; the cluster member to which, the client reconnects simply reloads the session from store.
10. A client session must be active at one gateway only. Cluster members share information about which session is active on, which Gateway, through the store. Each client session has one owner gateway, while the session is active at the owner other gateways are locked out of servicing connection requests for the session.
11. Gateway Failover—gateways monitor each other's presence (via the store), such that if one gateway fails then it's store will no longer be active. Other members are then no longer locked out of handling the sessions owned by the failed gateway, client sessions will fail-over to other gateways.

Components of a Gateway Cluster
1. The Gateways
By definition an iBus//Mobile cluster includes multiple gateway processes. Any gateway that is a member of the cluster is able to accept a WJMS connection request from any mobile device. Cluster membership is configured into the configuration files of each individual gateway.

1.A. The Gateway Locator
A gateway component called the 'Clustered Gateway Locator' must be enabled in the gateway config. The class that is usually entered as the clustered gateway locator is: ch.softwired.gateway.clustering.SimpleGatewayLocator.

The SimpleGatewayLocator reads the cluster membership from the configuration file of the local gateway process. The locator will not change, or adjust the cluster membership once it is instantiated, so reconfiguring the cluster requires restarting cluster members. For every member the SimpleGatewayLocator needs the 'ipaddress', 'port' and the supported network protocol (bearer) at which that gateway is accepting WJMS connections, to be in the local gateway config file. A SimpleGatewayLocator can be disabled in the configuration file by setting it's 'enabled' property to 'false', this has the effect of preventing the local gateway cluster connection Servlet from answering phase one client connect requests. Note that if the locator is disabled but other gateways are configured to include the local gateway then the gateway is still a cluster member, it addresses phase two connection requests and not phase one requests.

1.B. The Cluster Store
All gateways in a cluster share one session database, so their stores must all be physically located at the same place, and that file system must be accessible to every cluster member. Gateway stores have the following functionality that is specific to clustering:
1. The store maintains an 'active store instance' lock in the store location. Each store periodically updates its lock.
2. All cluster members monitor the store locks of all other Gateways to ascertain that other gateways have not failed.
3. Any session that is connected to the cluster is owned by one gateway (at any point in time).
4. Ownership is registered in the session entry in the data store.
5. Any gateway that wants to read or write the data for a session must first acquire the lock for that session.
6. Usually the session lock is held by the gateway to which the session is currently connected (the owner).
7. If a client disconnects and then reconnects to the cluster, the gateway to which it reconnects will have to first become the session owner.
8. If the session lock is still held by the previous owner (which is possible if the disconnect was not 'orderly' and previous owner has not yet timed out the session, or if the previous owner has failed and its active store lock has not yet timed out) then the reconnect gateway will reject the connection attempt, from the cluster point of view the session is still running.

2. The JMS Domain
All gateway processes in one cluster must connect to the same JMS messaging domain. Note that iBus//Mobile clustering addresses gateway scaling only, not JMS scaling. Additional mobile client connections can be serviced by deploying, and configuring additional gateways. The requirement that all cluster members connect to the same JMS domain implies that the JMS service must be capable of scaling to service the messaging load of all clients of all gateways.

3. Cluster Connection Servlets (Access Points)
Usually each gateway process includes a Servlet which responds to phase 1 connect requests. Phase 1 requests are HTTP requests made by the clustering enabled QOS to each Servlet, in sequence, until one access point returns a list of cluster connect points. Each time a client requests a WJMS connect point in the cluster the Servlet obtains a list of cluster members from the local clustered gateway locator.

As each cluster member deploys one (or possibly more) Servlets, clients can request connect points from a number of access point URLs. The precise http URL at which a gateway's cluster connection servlet is deployed can vary from one installation to another, provided the client applications know the URLs for the access points of the cluster. Obviously the cluster connect points that the client receives in phase 1 must support the bearer protocol that the client wants to use (e.g. TCP, HTTP, UDP etc). Hence the client request must include the bearer in the query string of the http servlet request.

An example of a URL that addresses a cluster connect Servlet is:

http://192.168.168.10:8080/ibus/cluster/SimpleGateway-Locator/Servlet?protocol=tcp 4. Client Application QOS For a mobile client to do the two phase cluster connection a CLUSTER_CONNECT protocol object is needed on the iBus protocol stack. The CLUSTER_CONNECT object is responsible for connecting to a cluster access point (Servlet via HTTP) to obtain the gateway cluster connect points. Once a connect point list is obtained CLUSTER_CONNECT will pass each connect point (ipaddress and port) down the stack to the CONNECT object until one of these phase 2 WJMS connections succeeds, and the client connection to the cluster is completed. Note that the application can pass the URLs of multiple access point Servlets to CLUSTER_CONNECT, in case any individual servlet is down.

Phase 1 of connecting to a cluster must indicate the connection protocol (TCP, UDP, HTTP) that the WJMS connections (to be established in phase 2) will use. The client application passes the list of access points to the CLUSTER_CONNECT object as a property on the QOS parameters: CLUSTER_SERVLET_URL, the presence of this property indicates to the iBus//Mobile client library that the client is connecting to a gateway cluster. The format of the access points list specified by CLUSTER_CONNECT_URL is:

http://hostname/servletpath?protocol=(tcp|http|udp)
{|http://hostname/servletpath?protocol=
(tcp|http|udp)| . . . }

Figure 4:
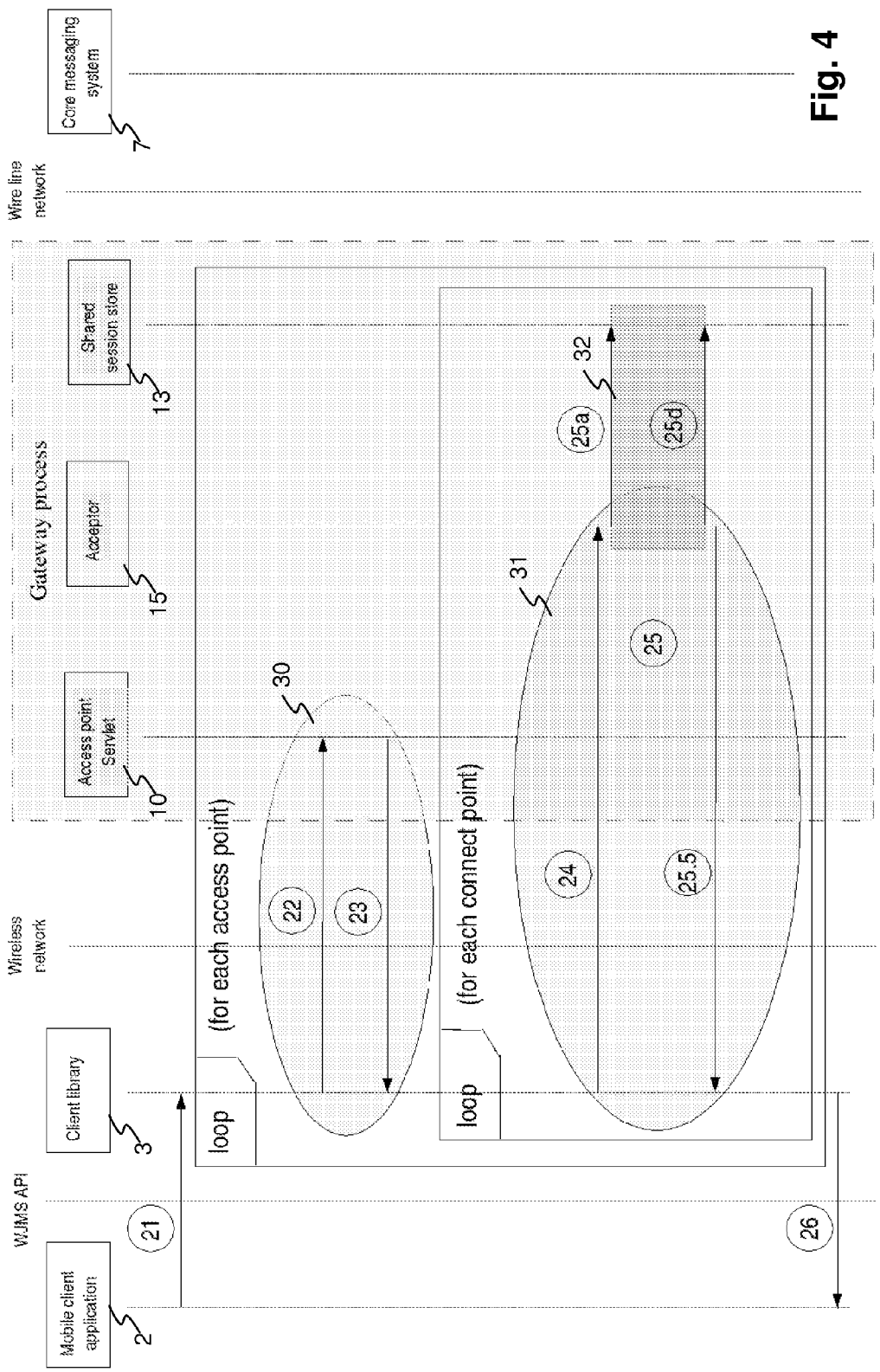
FIG. 4 a flow diagram of a program for operating the system.

In the following, a step by step description of a connection setup is given: FIG. 4 shows a flow diagram of a program for operating the system accordingly. The process steps are labeled with circled numbers 21-26 and are explained in more detail in the following. Phase one steps are encircled by an oval 30, phase two steps are encircled by a further oval 31. Shaded box 32 denotes mutual exclusion across acceptors and clustered gateways.

1. Client Application Initiates a Connect Request to iBus//Mobile Client Library (Label 21).

The request specifies:
1. The session ID of the iBus//Mobile client sessions.
2. The bearer type that the client wants to use.
3. A list of access points at which clustered gateway locator Servlets should be running.

2. Client Library Requests a Set of Connect Points (Label 22).

(Phase 1 Requests)

This phase one request is made across HTTP.

The client library will try each access point in order until a reply is received.

3. Clustered Gateway Locator Servlet Responds (Label 23).

(Phase 1 Reply.)

On receiving a phase 1 request the contacted locator determines which cluster members the client is best directed to.
The factors influencing the 'best member' consideration:
1. The load that individual members are currently reporting.
2. The bearer that the client application has specified.
The locator builds the list of connect points and replies.

4. Client Library Requests WJMS Connection from Connect Points (Label 24).

(Phase 2 Requests.)

On receiving the phase 1 reply the client library tries each received cluster member (at the provided connect point) in turn. This phase two request is made using the bearer protocol specified by the connect point. The client library will try each connect point in order until a connection is established. Each connect point is tried more than once before requests are issued to the next.

5. Clustered Gateway Processes a Connect Request (Label 25).

On receiving a connection request the gateway locks the session context in the session store (label 25a). If this lock operation fails then so does the connect request.

The session context is locked regardless of session existence, i.e. no distinction between initial connect requests and reconnect requests. While the session (or session context) is locked no other gateway, (or acceptor thread in the same gateway) can read or write the session state in the store.

The accepting gateway checks the session state, a closed state indicates that the session is not active anywhere in the cluster. The accepting gateway is free to create (or open) the session.

An open session state indicates that the session is active on the cluster.

The accepting gateway reads the session owner, i.e. an identifier specifying a gateway process, that is a cluster member, from the session store.
The accepting gateway reads the run status of the session owner.
If the registered owner is not running then the accepting gateway is free to create (or open) the session.
If the registered owner is running then the connect request fails. The session is already (still) running.

After confirming that the session is not already active in the cluster the accepting gateway registers itself as the owner of the open session.

After processing the connect request the accepting gateway unlocks the session in the store (label 25d).

The accepting gateway replies to the connect request, either connection accepted, or rejected. (Phase 2 reply, label 25.5)

In each gateway, multiple acceptor threads handle incoming requests for WJMS connections, i.e. phase two connection requests. This allows multiple clients to connect to each gateway simultaneously, which is important during a standalone gateway (or whole cluster) restart. So client connection establishment is multithreaded both within a gateway process, and between cluster members. An acceptor thread calls a client session manager for handling the session-related parts of the method.

As multiple member gateways may receive connection requests from the same client device simultaneously they will all contend for the same session information in the store.

There follows a brief summary of the concepts involved in the locking mechanism:

Session context: the context within which a WJMS message (and the corresponding JMS message) is sent. This context is altered by client operations versus the WJMS API, for instance create a JMS session on a JMS connection, or create a MessageProducer on an existing Destination within an existing JMS session, now use the MessageProducer to send a message.

Session identifier: A system wide unique string of characters that identifies the client application and the session context.

Session entry: Exists in the session store. Is the location in the store at which the session context (of the corresponding session identifier) is stored. If a session does not exist, i.e. the client app. with the corresponding session id has never yet connected then the entry does not exist either.

Session lock context: To avoid two threads (or Gateways) simultaneously updating the session context all operations on the store are single threaded wrt. the session id. The session lock context is the locking object on which the lock mechanism operates. The session lock context can exist regardless of session existence. The lock operation (on the session lock context) must be executed first regardless of session existence.

6. Client Library Returns to the Application (Label 26).

On receiving a (connection accepted) reply to the connect request the client library passes a positive return value "Connection established" to the client application.

On receiving a (connection rejected) reply the client library continues processing connect points (from the current access point) and other access points (if all current connect points failed). On exhausting all connect points received from all access points the client library passes a negative return value "Could not establish a connection" to the client application.

It may happen that a Gateway to which the session is connecting discovers that another Gateway, which claims to own the session is not running, i.e. has not updated the lock for a certain time. This may have been triggered by the client reconnecting elsewhere because the client no longer receives heartbeats from a former connection with the other Gateway. In such a situation, the gateway is allowed to break the locking of the session context. This is commonly called stealing a session.

As a result of this connection mechanism, a client can be active on only one gateway at any point in time; otherwise the session is "still running" elsewhere in the cluster. All client connect operations, reconnects and failovers are handled according to the same procedure. Failure of one gateway will cause the affected clients to switch over to another gateway automatically.

While the invention has been described in present preferred embodiments of the invention, it is distinctly understood that the invention is not limited thereto, but may be otherwise variously embodied and practiced within the scope of the claims.

LIST OF DESIGNATIONS 1 client
2 client application
3 client library
4 wireless connection
5 gateway
6 wirebound connection
7 messaging server
8 messaging client
9 data store
10 servlet
11 session context
12 mirrored context in the data store
13 local memory section
14 client session manager
15 acceptor threads

The invention claimed is:

1. A method for operating a gateway for wireless mobile clients in a messaging system, the messaging system being configured to comprise a plurality of mobile wireless clients, a core messaging system and at least one gateway process or gateway, the gateway acting as a proxy on behalf of the clients and, in the course of normal operation of the messaging system, maintaining sessions by performing the steps of:

the gateway receiving inbound messages from the clients over wireless bearers using a wireless protocol and forwarding said inbound messages to the core messaging system over a connection using a wirebound protocol;

the gateway receiving outbound messages from the core messaging system over a connection using a wirebound protocol and forwarding said outbound messages to the clients over wireless bearers using a wireless protocol;

the method further comprising the step of the gateway storing a session context, which session context comprises the status of a session established between the core messaging system and one of the clients, a state of the client connection associated with the session, and a session identifier which is unique to the session;

the method further comprising the steps of:

the gateway receiving a connection request from a client, the connection request comprising a session identifier;

the gateway checking whether a stored session context exists that comprises the same session identifier;

if such a stored session context exists, the gateway checking a status of the session represented by said stored session context;

if the status indicates that the session is already running, the gateway informing the client that the connection request is rejected;

wherein the step of checking the status of the session represented by said stored session context comprises the steps of:

the gateway initiating a lock operation on said session context;

if the lock operation does not succeed, the gateway informing the client that the connection request is rejected;

if the lock operation succeeds, the gateway locking the session context, thus preventing other process threads and optionally also other gateways from accessing the session context.

2. The method of claim 1, comprising the step of:

the gateway, on reconnection by a client library running on a client device that experienced an abrupt disconnection from the wireless network, reading the state of the client's connection/session identified by the received session identifier and recreating, on the client's behalf, the wireline connection with the core messaging system in the same precise state that resulted from the operations of the client application, prior to the abrupt disconnection.

3. The method of claim 1, comprising the further step of:

the gateway reading a session state stored in the session context;

if the session state is closed, indicating that the session is not active, the gateway opening the session and informing the client that the connection request is accepted.

4. The method of claim 3, comprising the further step of:

if the session state is open, indicating that the session is active, the gateway determining a session owner and a run status of said session owner;

if said run status shows the session owner is not running, the gateway opening the session and informing the client that the connection request is accepted;

if said run status of the session owner is running, the gateway informing the client that the connection request is rejected.

5. The method of claim 1, comprising the step of: mirroring the session context in a data store that is separated from the gateway.

6. The method of claim 1, wherein the step of the gateway receiving inbound messages from the clients comprises:

the gateway receiving notification of client application operations on the API implemented by the client library over a wireless bearer using a wireless protocol;

and the step of storing the session context comprises:

the gateway recording a change in connection/session state in a session context maintained by the gateway to reflect the precise context within which the client application sends and/or receives messages and persisting the session context to a shared store, as well as propagating the client operation to the core messaging system over a connection using a wirebound protocol.

7. A gateway computer for wireless mobile clients in a messaging system, the messaging system being configured to comprise a plurality of mobile wireless clients and a core messaging system, with the gateway computer comprising at least one gateway process or gateway for acting as a proxy on behalf of the clients and, in the course of normal operation of the messaging system, for maintaining sessions by performing the steps of, the gateway receiving inbound messages from the clients over wireless bearers using a wireless protocol and forwarding said inbound messages to the core messaging system over a connection using a wirebound protocol; the gateway receiving outbound messages from the core messaging system over a connection using a wirebound protocol and forwarding said outbound messages to the clients over wireless bearers using a wireless protocol; the gateway further comprising a session manager for storing a session context, which session context comprises the status of a session established between the core messaging system and one of the clients, a state of the client connection associated with the session, and a session identifier which is unique to the session.

8. A computer program for operating a gateway for wireless mobile clients in a messaging system, which computer program is loadable and executable on a data processing unit in a gateway computer, the messaging system being configured to comprise a plurality of mobile wireless clients, a core messaging system and the gateway computer for providing message forwarding from the clients to the messaging server and vice versa, and which computer program, when being executed on the gateway computer, performs the steps of the method of claim 1.

* * * * *